United States Patent [19]

Hatakeyama et al.

[11] Patent Number: 5,007,005

[45] Date of Patent: Apr. 9, 1991

[54] DATA PROCESSING SYSTEM

[75] Inventors: Yasuhiko Hatakeyama; Tomoo Aoyama, both of Hadano, Japan

[73] Assignees: Hitachi, Ltd., Tokyo; Hitachi Computer Engineering Co., Ltd., Kanagawa, both of Japan

[21] Appl. No.: 329,556

[22] Filed: Mar. 28, 1989

[30] Foreign Application Priority Data

Mar. 28, 1988 [JP] Japan ................................ 63-73887

[51] Int. Cl.[5] ................................ G06K 1/00

[52] U.S. Cl. ................................ 364/521; 340/725

[58] Field of Search ................ 340/725, 724, 723; 364/521, 518, 578, 192; 358/185, 311

[56] References Cited

U.S. PATENT DOCUMENTS 4,864,289 9/1989 Nishi et al. ........................ 340/725

*Primary Examiner*—Arthur G. Evans

*Attorney, Agent, or Firm*—Antonelli, Terry, Stout & Kraus

[57] ABSTRACT

A data processing system capable of implementing at high speeds animating image generation processing and animating image display processing in synchronization with each other, thereby generating and displaying an animating image in a real time. The data processing system uses a given memory area of a storage unit as a screen buffer memory for storing an animating image data for each screen and is provided with an image processor for writing an animating image data for each screen in a screen buffer memory, an image display processor for reading the animating image data for from the screen buffer memory and for generating a display screen graphic signal to be supplied to a display unit and a hardware register circuit having a screen read-out control register corresponding to the animating image data for each screen of the screen buffer memory. The hardware register circuit updates data of the screen read-out control register in synchronization with each of a write operation of an animating image data from the image processor and a read operation of the animating image data to the image display processor. A delivery and a receipt of the data of the animating image data for each screen is carried out at high speeds between the image processor and the image display processor through the screen buffer memory storing the animating image data therefor by a control of the hardware register circuit.

9 Claims, 4 Drawing Sheets

DATA PROCESSING SYSTEM

BACKGROUND OF THE INVENTION

1. Field of the Invention

The present invention relates to a data processing system and, more particularly, to a data processing system adapted to make a real-time display of animating image data generated by numerical computation and so on or by image processing.

2. Description of Related Art

In an image processing system by a data processing unit, when an image data which is generated by computation of data processing including image processing by programming on a host computer is displayed on a display unit, the image data is transferred from a main storage of the host computer through a standard input-/output interface such as RS-232C to a display terminal unit having an image memory and the image data stored in the image memory is displayed on the display terminal unit. In an image data processing system using a display terminal unit with data processing capabilities, an original data of an image data to be generated by computation is transferred from the main storage of the host computer through a standard input/output interface to the display terminal unit with data processing capabilities and with an image memory. In the display terminal unit, the original data of the image data is processed by the display terminal unit in the image memory in a working area to generate display image data, and a display image of the resulting display image data in turn is displayed on the display terminal unit.

As a display terminal unit capable of displaying such an image data, a graphic display unit with a three-dimensional image generating function has been developed and is currently available on the market.

The image processing system using the data processing unit as have been described hereinabove may display on a variety of display screens of physical properties of an object by computation of data processing. The data processing includes image processing in analyzing physical properties of the object and the like. However, a conventional image processing system does not have sufficient data processing capabilities for animating image processing. Animating image processing executes the data processing attendant upon the image processing for displaying as animating images a state of the object periodically or in a course of time. In such animating image processing the object is transformed into various forms upon influences of various stresses and a state of periodical changes in circumstances in which a fluid field with the object in its fluid exerts influences upon the object and the object is transformed into various forms causing a turbulence in the fluid field.

In the field of designing airplanes, automobiles and the like, an image processing system has been strongly demanded which has an animating image display function capable of displaying on a screen in real time a dynamic variation in air flows in order to design shapes of airplane and vehicle bodies by analyzing influences of characteristics of fluid dynamics upon the shapes of airplane and vehicle bodies.

Recently, there has been developed a data processing system, such as a supercomputer, which is provided with sufficient data processing capabilities and can process a real-time numerical calculation for analysis processing of objects and dynamic variations of fluids. Accordingly, a system structuring using a supercomputer for numerical computation of the analysis processing, image generation processing and so on permits a computation of variations of an object in time and circumstances and of physical phenomena upon the object with a considerably high speed and accuracy. Its image display processing capabilities, however, are insufficient for displaying as animating images in real time a tremendous amount of computation results obtained as a result of the data processing by programs, which indicates a periodical variation in the object and circumstances outside the object. As a result, the data processing by programs cannot display the computation results of analysis as animating images so that there are seen cases where each of a plurality of graphic display screens is photographed by a 16 mm camera or by a video camera and photographs are reproduced as animating graphics. This presents great difficulties in research on dynamic changes of the object.

As have been described hereinabove, the image processing system by the data processing unit with sufficient data processing capabilities is insufficient in capabilities of the image display processing so that, even if a system could be structured using an image processor, such as a supercomputer, capable of generating an animating image data in a real time with high speeds, the capabilities of the image display processing is so insufficient that the animating image generated at high speeds cannot be displayed in a real time, and images displayed are restricted to static images or graphics animated at very low speeds.

SUMMARY OF THE INVENTION

Therefore, the present invention has the object to provide a data processing system with an image processor capable of generating an animating image data in real time and with image display processing capabilities for displaying the animating image data generated in real time.

In order to achieve the above object, the data processing system according to the present invention comprises an image processor, an image display processor, and a hardware register circuit. The image processor makes use of a predetermined memory area in a storage unit as a screen buffer memory for storing animating image data for each of screens and for writing such animating image data generated in the screen buffer memory. The image display processor reads out the animating image data for each screen from the screen buffer memory and generates a display screen graphic signal to be fed to a display unit. The hardware register circuit includes a screen read-out control register for controlling a read-out of screens in correspondence with the animating image data for each screen in the screen buffer memory and a function for updating or renewing data of the screen read-out control register in synchronization with a write operation of the animating image data from the image processor or a read operation of the animating image data to the image display processor.

The predetermined memory area in the storage unit is used as the screen buffer memory for storing the animating image data for each screen and is provided with the hardware register circuit having the screen read-out control register in correspondence with the animating image data for each screen in the screen buffer memory. The image processor is to write the generated animating image data for each screen in the screen buffer memory in the storage unit. The image display processor is to read the animating image data written in the screen buffer memory and generate display screen graphic signals to be fed to the display unit. The hardware register circuit updates or renews the data of the screen read-out control register in synchronization with each of the write operation by the image processor for writing the animating image data in the screen buffer memory in the storage unit and the read operation by the image display processor for reading out the animating image data for each screen. This arrangement permits an offer and a receipt of the animating image data for each screen between the image processor and the image display processor in synchronization with each other through the screen buffer memory for storing the animating image data for each screen. Thus the data processing system according to the present invention is provided with sufficient capabilities of image display processing.

As have been described hereinabove, the hardware register circuit provided in the data processing system according to the present invention carries out the write operation for writing the animating image data for each screen and the read operation for reading out the animating image data while each of the image processor and the image display processor always refers to data in the screen read-out control register of the hardware register circuit, so that the animating image generation processing by the image processor and the animating image display processing by the image display processor can be executed as one collective job and in synchronization with the animating image generation processing and the animating image display processing, thus generating and displaying the animating image data in a real time.

BRIEF DESCRIPTION OF THE DRAWINGS

The other objects and features of the present invention will become apparent in the course of a description on the following preferred embodiments in conjunction with the drawings appended hereto.

DETAILED DESCRIPTION OF THE PREFERRED EMBODIMENTS

Figure 1:
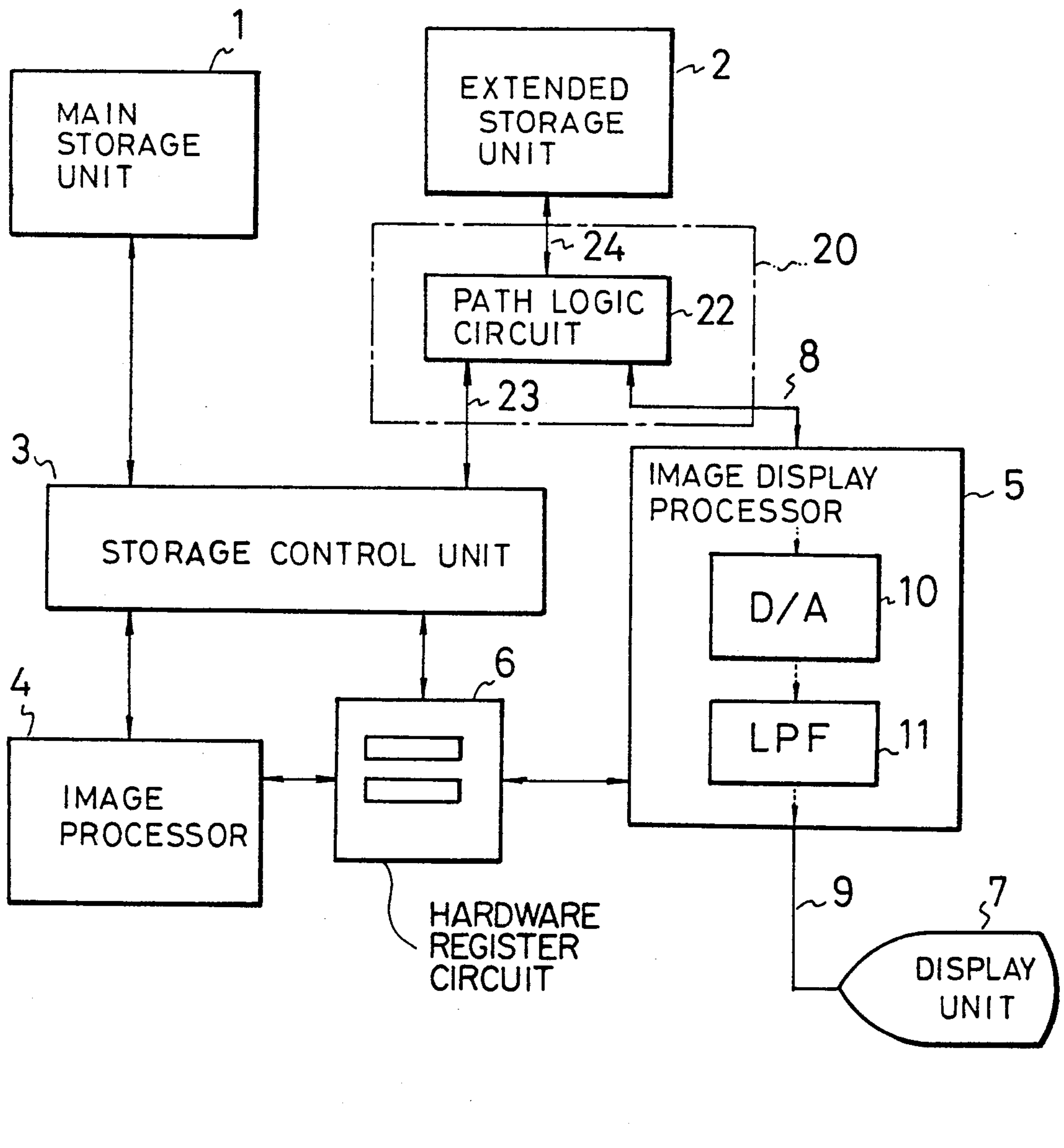
FIG. 1 is a block diagram showing an outline of a brief structure of the data processing system as one of preferred example according to the present invention.

As shown in FIG. 1, reference numeral 1 stands for a main storage unit, 2 for an extended storage unit in which a predetermined memory area is used as a screen buffer memory for storing the animating image data for each screen, 3 for a storage control unit, 4 for an image processor, 5 for an image display processor, 6 for a hardware register circuit, and 7 for a display unit. Furthermore reference numeral 8 stands for a image data path for feeding an image data to the image display processor 5, and reference numeral 9 stands for a graphic signal path for feeding a display screen graphic signal to be output from the image display processor 5 to the display unit 7. Reference numeral 10 denotes a digital/analog converter (a D/A converter), and reference numeral 11 denotes a low path filter. Reference numeral 20 stands for a path control logic part, and reference numeral 22 stands for a path logic circuit. The path logic circuit 22 of the path logic part 20 is a circuit for executing a path control for switching an access path to the extended storage unit 2 by time-sharing an access from the storage control unit 3 and the image display processor 5.

A signal mode of an image interface for connecting the image display processor 5 to the display unit 7 uses an NTSC mode which has been extensively used as standard signals for color televisions. For brevity of explanation, display screen graphic signals to be fed to the display unit 7 are described herein as graphic signals in a non-interlace mode of the NTSC mode having the frame frequency of 30 Hz, the number of scan lines of 525, and the bandwidth of 4.2 MHz. The image processor 4, the storage control unit 3, and the image display processor 5 are all operated in a machine cycle of 100 ns.

The image processor 4 uses a predetermined memory area of the main storage unit 1 and, as needed, a predetermined memory area of the extended storage unit 2 as working area and writes an animating image data obtained as a result of processing in a memory area used as a screen buffer memory in the extended storage unit 2 through the storage control unit 3 (data bus 23) and the path logic circuit 22 (data bus 24), the animating image data obtained as a result of executing the image processing for a natural image or an artificial graphic. The animating image data written in the screen buffer memory of the extended storage unit 2 is then read through the path logic circuit 22 and transferred to the image display processor 5 through the image data path 8. The image display processor 5 generates NTSC graphic signals for the graphic signal path 9 by converting the animating image data fed from the image data path 8 into display screen graphic signals. The NTSC graphic signals generated from the graphic signal path 9 enter the display unit 7 and are displayed on the display screen as an animating image. Although the NTSC graphic signals generated from the image display processor 5 contain synchronization signals such as vertical synchronization signals, horizontal synchronization signals, color synchronization signals and so on, control data for adding these synchronization signals is generated at the same time as the image processor 4 generates an animating image data, and it is added to the animating image data as attribute data.

As each operation by the image processor 4 and the image display processor 5 is synchronized when the image processor 4 is operated to write the animating image data generated in the screen buffer memory of the extended storage unit 2 or when the image display processor 5 is operated to read the animating image data for each screen from the screen buffer memory thereof, data of the screen read-out control register is updated or renewed in the hardware register circuit 6. The hardware register circuit 6 is provided with the screen read-out control register corresponding to the animating image data for each screen in the screen buffer memory, thus updating the data of the screen read-out control register in synchronization with the write operation of the animating image data from the image processor 4 or with the read operation of the animating image data to the image display processor 5.

Figure 2:
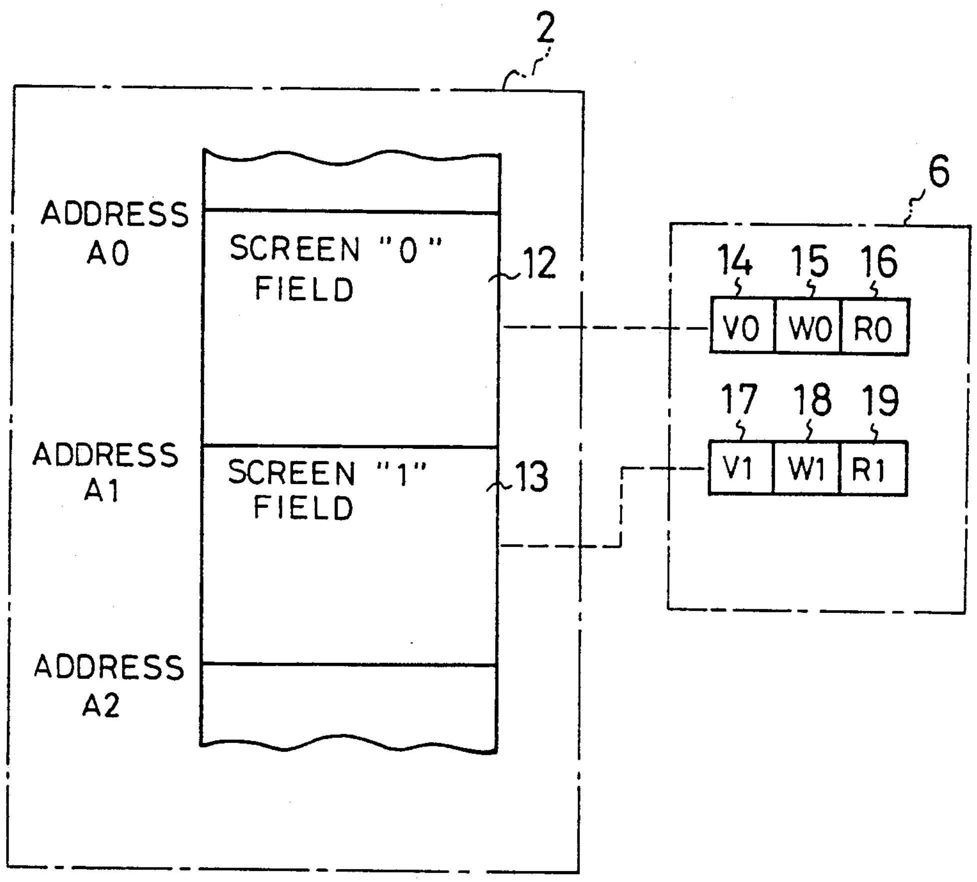
FIG. 2 is a diagram showing an explanation of an operation function of a hardware register circuit.

FIG. 2 is a view for explaining an operation function of the hardware register circuit 6. In FIG. 2, reference numeral 12 stands for a screen "0" field of the screen buffer memory in a predetermined memory area of the extended storage unit 2, reference numeral 13 for a screen "1" field of the screen buffer memory, reference numerals 14, 15, and 16 each for a 1 bit register of the screen read-out control register set in correspondence with the screen "0" field of the screen buffer memory, and reference numerals 17, 18, and 19 each for a 1 bit register of the screen read-out control register set in correspondence with the screen "1" field of the screen buffer memory.

Figure 3:
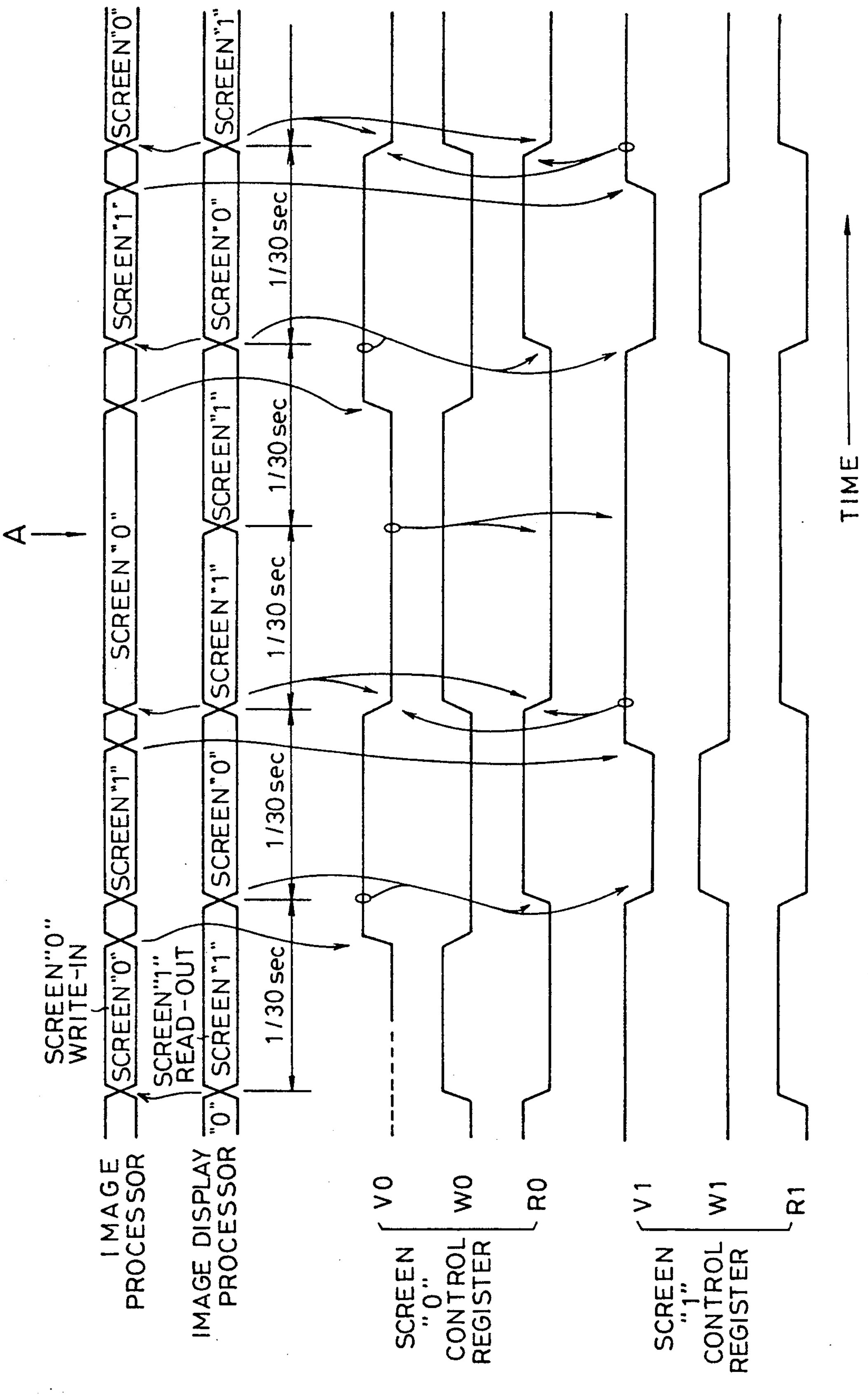
FIG. 3 is a timing chart showing operation of screen display processing.

The operation function of the hardware register circuit 6 will be described with reference to FIG. 2. In the extended storage unit 2, a predetermined memory area is used as a screen buffer memory for storing ananimating image data for each screen. As shown in FIG. 2, a memory area of the extended storage unit 2 ranging from address A0 to address A1 is provided in a screen buffer memory for a memory field for two screens as the screen "0" field 12 and the screen "1" field 13, storing ananimating image data generated in the screen buffer memory and reading the animating image data stored therein. The hardware register circuit 6 is provided with control registers of 6 bits comprising a screen read-out control register of 3 bits consisting of a V0 bit register 14, a W0 bit register 15, and an R0 bit register 16, each corresponding to the screen "0" field, and a screen read-out control register of 3 bits consisting of a V1 bit register 17, a W1 bit register 18, and an R1 bit register 19, each corresponding to the screen "1" field. These screen read-out control registers update these data in synchronization with each other at each time when the write operation and the read operation by each of the processors are executed. When each bit of these registers is 1, it is intended herein to mean the following:

V0: content of the screen "0" field effective
W0: writing in screen "0" field
RO: reading from screen "0" field
V1: content of the screen "1" field effective
W1: writing in screen "1" field
R1: reading from screen "1" field FIG. 3 is a timing chart showing the operation of the screen display processing, and conditions for updating each of the bits will be described in conjunction with FIG. 3.

The V0 bit is set as the writing of the screen "0" field 12 by the image processor 4 was finished, on the one hand, and reset as the reading by the image display processor 5 was finished, on the other hand. The V1 bit is processed in substantially the same manner as the V0 bit. However, for example, as at the point "A" in the timing chart of FIG. 3, unless the image processor 4 has finished writing for the screen "0" (i.e., V0=0) at the point when the image display processor 5 has finished reading the screen "1", the image data for the screen "1" is continued to be read and displayed on the display unit 7 so that the V1 bit is not yet reset.

The W0 bit indicates that the writing in the screen "0" field is in process. As the screen field set in the screen buffer memory is for two screens, the W0 bit is always reversed from the V0 bit. If the number of screens set in the screen buffer memory is increased to three or more, however, a change of timings different from the V0 bit is indicated. So does the W1 bit.

The R0 and R1 bits indicate the reading of the screen "0" field and the screen "1" field, respectively, in process. As the writing from the image processor 4 is effected in a smooth manner, the R0 and R1 bits are changed alternately from "1" to "0" and vice versa in a pitch of 1/30 seconds. Unless the write operation of the image processor 4 has been finished at the time when the reading of the image display processor 5 has been finished as have been described hereinabove, the image data of the same screen is repeated to be re-read so that neither the R0 bit nor the R1 bit are set or reset as at the time "A" in the timing chart of FIG. 3.

An updating control for each of the bits of the screen read-out control register is implemented in the hardware register circuit 6 in the manner as have been described hereinabove.

A method of using each of the bits of the screen read-out control register will now be described.

The V0 and V1 bits are used for transition of states of the screen read-out control register (including the V0 and V1 bits) of the hardware register circuit 6. The W0 and W1 bits ar used for a synchronization control of the write operation in the extended storage unit 2 from the image processor 4. As the W0 and W1 bits are both "0", there is suppressed a generation of fresh image data by the image processor 4. As either of the W0 bit or the W1 bit is "1", the animating image data generated is written in the respective screen field. In other words, the W1 bits are used for generation of a write address on the extended storage unit 2. For example, as shown in FIG. 2, if the screen "0" field and the screen "1" field are allocated in a continuous area of a memory area starting from the address A0 and a memory area starting from the address A1, respectively, on a memory area of the extended storage unit 2, a write address is determined by adding A0 or A1 to a displacement value of an address of a memory area in which an image data for each image is stored. It is to be noted that the W0 and W1 bits are not "1" at the same time. There is the possibility that a time required for writing an image data for one screen may vary with a competition of sources to be used for processing or the like. The R0 and R1 bits are used for a synchronization control for the reading when the image display processor 5 reads an image data of each screen from the extended storage unit 2. As either of the R0 bit or the R1 bits is always "1", a timing for switching the R0 and R1 bits is fixed in 1/30 seconds. However, unless the writing of the image data for a screen to be read has been finished, there are occasions that the switching may not be effected. Like the W0 and W1 bits, the R0 and R1 bits are used for calculating a read address.

Figure 4:
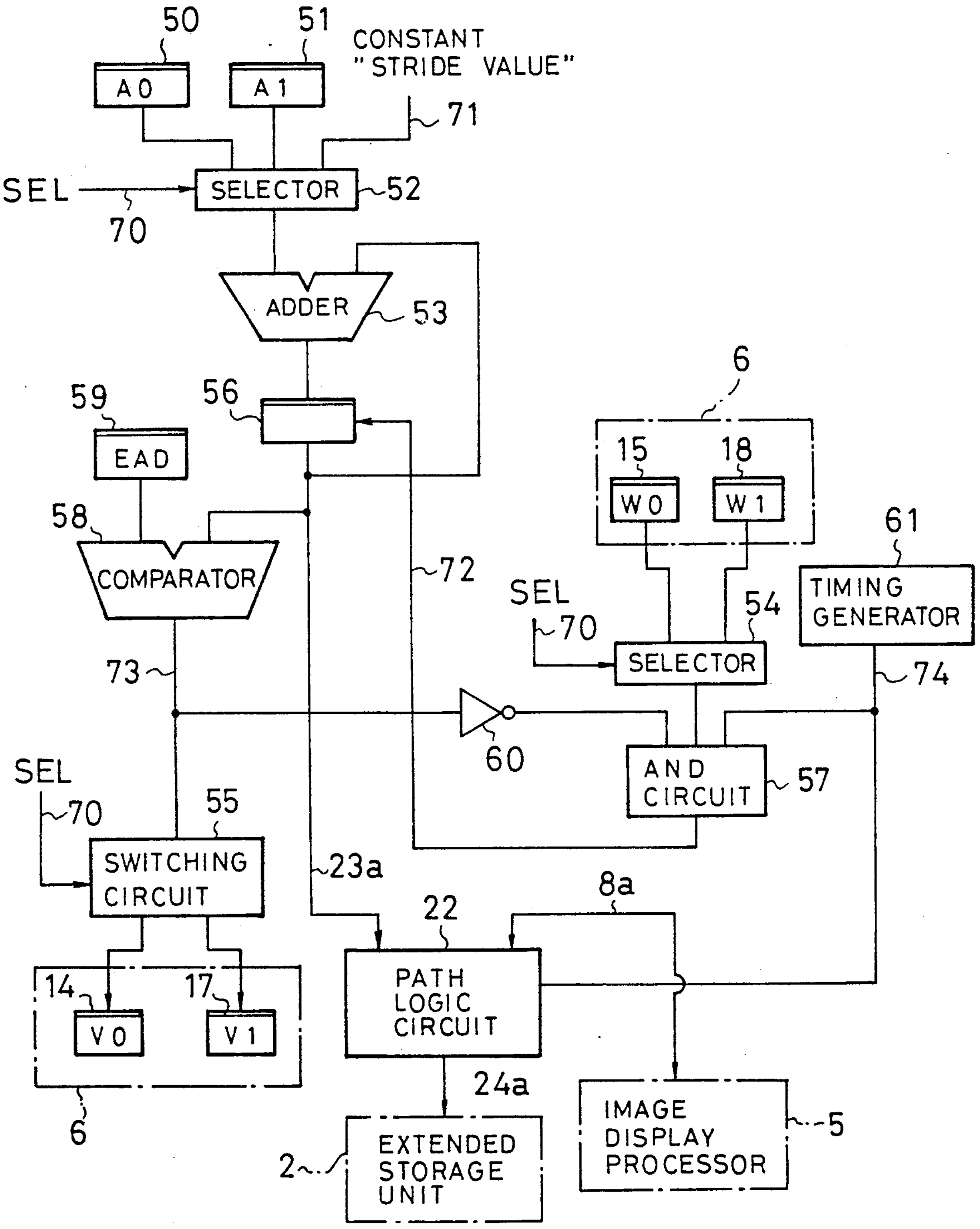
FIG. 4 is a block diagram showing an essential portion of a path control logic part.

FIG. 4 is a block diagram for the essential portion of the path control logic part, indicating the structure of a circuit block of an essential portion which involves a control over the screen read-out control register of the hardware register circuit 6 and over an address generation part of the image processor 4. In FIG. 4, the same elements are provided with the same reference numerals as in FIG. 1.

Path control processing of an access path to the extended storage unit 2 will be described with reference to FIG. 4. Registers 50 and 51 accommodate address data of addresses A0 and A1 (FIG. 2), respectively. A value is set to the register 50 and 51 by the instruction processing of the image processor 4. Outputs of the registers 50 and 51 are selected by a selector 52 and enter an adder 53. A SEL signal from a path 70 for providing a selection instruction of the selector 52 is generated by a microprogram or the like in an image generating processor and supplied through the path 70 to a selector 54 and a switching circuit 55, too, on top of the selector 52.

The SEL signal is to indicate an access to a memory area of either of the screen "0" field or the screen "1" field in the screen buffer memory (FIG. 2) from the image processor 4.

An address reference value input in the adder 53 is accommodated in a register 56. At the next timing, the selector 52 selects a constant path 71 on which a stride value between image data in the screen "0" field 12 and the screen "1" field is supplied. The registers 15 and 18 hold each W0 and W1 bits, and outputs therefrom are selected by the selector 54 and then input in an AND circuit 57. AS the output of the AND circuit 57 is switched to "1", a set signal is supplied through the path 72 to the register 56. A supply of the set signal from the AND circuit 57 updates an address value of the register 56 in sequence, generating an address series. The output of the address value from the register 56 is compared with a value of a register 59 using a comparator 58. The value of the register 59 is an address value at the end of the address for reading an image data from the respective memory area, the address value being defined primarily from a size of a memory area in which the screen "0" field/screen "1" field (a size of the addresses A0-/A1) are set. As the address value (End Address: EAD) at the end of the address series generated by the register 56 is detected by the comparator 58, and END signal is generated on a path 73 and input through an inverter 60 to the AND circuit 57, thus interrupting the generation of the address series. The switching circuit 55 sets the register 14 or the register 17 by application of the END signal on the path 73 thereto. This corresponds to an operation of setting the V0 bit/V1 bit when the writing of the image data in the memory area of the extended storage unit 2 was finished. A timing generator 61 is to change outputs from 0→ 1→ 0→ 0→ 1→ . . . in every machine cycle, and outputs from the timing generator 61 are supplied on a path 74 entering the AND circuit 57 and the path logic circuit 22 which in turn feeds an address on a path 23*a* to a path 24*a* when the signal value on the path 74 is "1". If the signal value on the path 74 is "0", a path 8*a* is connected to the path 24*a*. As have been described hereinabove, the path logic circuit 22 implements the switching process for generating an access in a time-sharing and parallel manner to the extended storage unit 2 from the image processor 4 and the image display unit 5 on the basis of an output from the timing generator 61. The address line on the path 23*a* is generated in every two machine cycles in correspondence with a switch instruction signal on the path 74.

In accordance with the embodiments according to the present invention, a control data for adding a synchronization signal to a graphic signal for an animating image by application to an animating image data as an attribute data is designed to be added to an animating image data generated simultaneously when the image processor 4 generates an animating image data. A control data for adding the synchronization signal to the graphic signal for the animating image, however, may be used in common among animating image data for each screen so that a control data written in the extended storage unit 2 may be repeatedly utilized, for example, when a first animating image data is generated. Alternatively, the control data for adding the synchronization signal may be designed to allow the image display processor 5 to generate while the extended storage unit 2 holds only the animating image data. Furthermore, in instances where a display unit having some data processing function is used as the display unit 7, a type of signal between the image display processor 5 and the display unit 7 may be a digital signal, and an addition of the synchronization signal may be processed by the display unit 7.

The structuring of the essential portions according to the embodiments as have been described hereinabove will be summarized hereinbelow.

(1) The screen read-out control registers 14 to 19 in the hardware register circuit 6 ar updated or renewed as an animating image data for each screen is generated by the image processor 4 and the writing of the animating image data in the screen buffer memory for storing it has been finished. The image display processor 5 processes conversion of an animating image data for one screen in sequence into a display screen graphic signal by recognizing a full writing of the animating image data for one screen in the screen buffer memory with reference to the screen read-out control registers 14 to 19 of the hardware register circuit 6, thus transferring the display screen graphic signal to the display unit 7. At this time, the image display processor 5 executes the processing, as needed, for the D/A conversion or for addition of synchronization signals such as horizontal synchronization signals, vertical synchronization signals, and color synchronization signals, or the like.

(2) The screen read-out control registers 14 to 19 in the hardware register circuit 6 are updated or renewed as the reading by the image display processor 5 has been finished. The image display processor 5 generates a next animating image data by recognizing a release of a memory area for one screen in the screen buffer memory with reference to the screen read-out control register 14 to 19 in the hardware register circuit 6 and then writes the next animating image data in the memory area.

(3) The screen buffer memory provided in a given memory area on the extended storage unit 2 has areas for the screen fields 12 and 13 for plural pages of screens. The updating or renewing and reference operations to the hardware register circuit 6 from the image display processor 5 are carried out at the same time as the read operation of an animating image data for each screen by means of a control operation of a hardware, not by means of a software processing. This permits a display of the animating image data in a real time.

(4) The writing on the screen read-out control registers 14 to 19 in the hardware register circuit 6 are executed by an instruction from the image processor 4. Although there is the possibility of reproducing a logical operation between the two processor by using a memory means on the image processor 4, such as, for example, the main storage unit 1, other than the screen read-out control registers 14 to 19 in the hardware register circuit 6, the main storage unit 1 does not have an access speed high enough as a control register for executing the image display processing in a real time. As a main storage unit of a processing unit with sufficiently high data processing capabilities, such as a supercomputer to be used as an image processor, issues plural accesses from a vector processing part, a scalar processing part or other accessory units, either of these accesses or an access of the image display processor is rested if the former would come into collision with the latter. From this reason, the embodiments according to the present invention are provided with the screen read-out control registers 14 to 19 for exclusive use.

(5) If a supercomputer, for example, is used as the image processor 4, this processor is connected to the image display processor 5 through a machine cycle conversion logic if a machine cycle on the supercomputer side is different from the machine cycle on the side of the image display processor 5. In this case, particularly, as the main storage unit 1 is accessed from the side of the image display processor 5, an access order decision circuit and the like in the storage control unit 3 should be changed if addition of a port is made to the storage control unit 3 and the storage control unit 3 is connected to the main storage unit 1 through the port. This change requires more costs. In the embodiments according to the present invention, the hardware register circuit 6 for exclusive use, which is accessible from the two processors, is provided by considering a time limit, costs, conditions for changes in the arrangement from the image processor 4, and the like.

As have been described hereinabove, the embodiments according to the present invention permit a high-speed synchronization of the writing operation with the reading operation of the screen buffer memory disposed in the extended storage unit 2, thus enabling an animating image data generated in a real time by an image processor such as a supercomputer or the like to be displayed in a real time without an irregularity of an image on the screen. It may happen that the movement of an animation screen suspends in a frame unit momentarily at the time of switching screens of the screen fields, however, this phenomenon can be practically rendered negligibly small in frequency if an image processor with a sufficiently high through-put. If a through-put of the image processor becomes lower by executing complex processing and a suspension of the screen frame of an animation would happen to a visible extend, a display that the display image of an animating image is in a state of temporary suspension can be made with a signal indicating the display image being in a state of temporary suspension, for example, such as with a square mark, provided at a corner of the display screen by using a data of the screen read-out control register in the hardware register circuit, thus creating no artificial impression upon the display screen of the animating image data. A data of the screen read-out control register in the hardware register circuit can also be used as a temporary stop instruction signal of a recording function in recording graphics in an outside image recording unit such a VTR and so on.

The data processing system according to the above embodiments provides a simulation of an image of movement of an object on a display unit connected to the data processing unit by entering equations describing a behavior of the object and initial conditions therefor. Accordingly, the data processing system according to the present invention permits objective conditions to be selected with high prospects and experiments for determining a structure of the object, saving a great number of useless experiments in fields of thermal, fluid, and structure analyses as well as molecular designs and so on.

The present invention has been described by way of examples, and it is to be understood that the present invention should be interpreted to be restricted by no means to those embodiments as have been described hereinabove and to encompass various variations and modifications without departing from the spirit of the present invention.

As have been described, the data processing system according to the present invention is provided with the hardware register circuit and designed so as to allow the image processor to carry out the write operation of an animating image data for each screen and to allow the image display processor to carry out the read operation of the animating image therefor by always referring to a data of the screen read-out control register in the hardware register circuit. This arrangement permits the animating image generation processing in the image processor and the animating image display processing in the display image processor as a collective job, thus leading to an implementation of the animating image generation processing in synchronization with the animating image display processing at high speeds and enabling a generation and a display of the animating image in a real time. Accordingly, as have been described hereinabove, the data processing system according to the present invention permits a real-time display of the animating image data generated in a real time by a high-speed image processor such as a supercomputer without any irregularity of the display screen.

What is claimed is:

1. A data processing system comprising:

an image processor for generating animating image data for each of a plurality of screens and writing said animating image data in a screen buffer memory;

an image display processor for reading said animating image data from said screen buffer memory and generating a display screen graphic signal to be supplied to a display unit; and a hardware register circuit for updating data of a screen read-out control register in synchronization with each of a write operation of animating image data from said image processor and a read operation of animating image data to said image display processor.

2. A data processing system as claimed in claim 1, wherein said hardware register circuit is provided with a screen read-out control register corresponding to animating image data for each screen in the screen buffer memory and said hardware register circuit updates data of said screen read-out control register in synchronization with each of said write operation of animating image data from said image processor and said read operation of animating image data to said image display processor.

3. A data processing system as claimed in claim 1, wherein a predetermined memory area of a storage unit functions as said screen buffer memory for storing animating image data for each screen.

4. A data processing system comprising:

an image processor for generating animating image data for each of a plurality of screens and writing said animating image data in a screen buffer memory which uses a predetermined memory area of a storage unit for storing said animating image data;

an image display processor for reading said animating image data from said screen buffer memory and generating a display screen graphic signal to be supplied to a display unit; and a hardware register circuit having a screen read-out control register corresponding to said animating image data for each screen in said screen buffer memory, said hardware register circuit updates data of said screen read-out control register in synchronization with each of a write operation of animating image data from said image processor and a read operation of said animating image data to said image display processor.

5. A data processing system as claimed in claims 1 or 4, wherein said screen buffer memory storing said animating image data is provided in a predetermined memory area of a main storage unit and said animating image data generated by said image processor is written in said screen buffer memory of said main storage unit.

6. A data processing system as claimed in claims 1 or 4, wherein said screen buffer memory storing said animating image data is provided in a predetermined memory area of an extended storage unit and said animating image data generated by the image processor is written in said screen buffer memory of said extended storage unit.

7. A data processing system as claimed in claims 1 or 4, wherein said image display processor is provided with a digital/analog converter and a low path filter and said animating image data written in said screen buffer memory is read from said screen buffer memory, said digital/analog converter generates said display screen graphic signal as an analog signal.

8. A data processing system as claimed in claims 1 or 4, wherein said hardware register circuit is provided with a screen read-out control register corresponding to said animating image data for each screen in said screen buffer memory, said hardware register circuit updates data of said screen read-out control register in synchronization with each of said write operation of said image processor for writing said animating image data in said screen buffer memory or said read operation of said image display processor for reading said animating image data from said screen buffer memory.

9. A data processing method for a data processing system having a screen buffer memory, an image processor, an image display processor, and a hardware register circuit, comprising the steps of:

processing an image by said image processor including the substeps of generating an image, writing said image in said screen buffer memory, and updating data of a screen read-out control register of said hardware register circuit; and processing a display of said image by said image display processor including the substeps of reading said image from said screen buffer memory and updating data of said screen read-out control register of said hardware register circuit.

* * * * *